United States Patent [19]

Sauder

[11] Patent Number: 4,477,219
[45] Date of Patent: Oct. 16, 1984

[54] DISPENSING APPARATUS

[75] Inventor: Charles J. Sauder, Archbold, Ohio

[73] Assignee: O.S. Equipment Inc., Archbold, Ohio

[21] Appl. No.: 424,377

[22] Filed: Sep. 27, 1982

[51] Int. Cl.³ .............................................. B65G 59/06
[52] U.S. Cl. .................................. 414/126; 156/565; 156/573; 221/251; 221/293; 414/113
[58] Field of Search ....................... 414/113, 125, 126; 221/251, 292, 293; 156/564, 565, 573

[56] References Cited

U.S. PATENT DOCUMENTS

| | | | |
|---|---|---|---|
| 2,730,144 | 1/1956 | Joa | 414/126 X |
| 2,974,828 | 3/1961 | Matteson | 221/251 X |
| 3,108,715 | 10/1963 | Farnsworth | 221/251 X |
| 3,283,955 | 11/1966 | Crabtree | 221/251 |
| 3,468,455 | 9/1969 | Voorhis | 221/251 X |
| 3,675,791 | 7/1972 | Russell et al. | 414/80 |
| 3,873,000 | 3/1975 | Eaton et al. | 414/126 X |

Primary Examiner—Leslie J. Paperner
Attorney, Agent, or Firm—Emch, Schaffer & Schaub Co.

[57] ABSTRACT

A dispensing machine for the dispensing and aligning of individual articles on a receiving surface is disclosed. The dispensing machine has clamping arms for holding the articles in a stationary position. Jaws are positioned adjacent the receiving surface. The clamping arms act to regulate the supply of articles such that only one article is dispensed at a time. The jaws allow the article to be dispensed onto the receiving surface and further acts to align the article in a precise location. The clamping arms and the jaws are operated by a slide member which causes the clamping arms to engage and disengage and also opens and closes the jaws.

13 Claims, 12 Drawing Figures

DISPENSING APPARATUS

BACKGROUND OF THE INVENTION

The invention relates generally to a means for dispensing an article onto an object and positioning that article on the object. More specifically, the invention is directed to an apparatus for individually dispensing any generally rigid planar article on an object and positioning that object in a precise, predetermined location on the object.

Normally, when an article is dispensed onto an object, it is positioned in a rather haphazard manner. The article must then be further positioned or aligned in its correct position. Often this is done manually, with the operator using hand-eye coordination. Many times the work performed manually is not of a consistent quality. In many situations consistency and high accuracy of the special alignment is critical.

Also, many times it is not desirable for an operator to perform manual tasks in close poximity to dangerous moving machine parts or dangerous materials. An operator, concentrating on the aligning of the article on the object, may not be aware that a hazard exists.

In the situation of placing mirrors on sun visors used in automotive vehicles, a hot melt thermoplastic glue is often used to attach the mirror to the sun visor. Since the glue sets very quickly it is important that the mirror be aligned in the correct position accurately and rapidly. Also, since the glue is at a high temperature when it is dispensed onto the visor, there is a risk that the operator will be injured by the hot glue.

Thus, there is a need for an assembly device such as a dispensing apparatus that performs consistently and accurately with little risk to a machine operator. There is a further need for a dispensing apparatus that can be adapted to accommodate a supply of articles with varying dimensions.

SUMMARY OF THE INVENTION

The present invention is directed to an apparatus for dispensing articles which includes a dispensing and positioning means. Even when exact spacial alignment is a critical factor in the assembly of a device and manual placement of an article is not feasible or practical, by using the present apparatus, the article is dispensed and aligned on a receiving object in a precise predetermined location.

A sleeve means containing a stack of articles to be dispensed is positioned on the dispensing apparatus. The sleeve means has an opening at its lower end. The stack of articles extends through the opening and is held in position in the sleeve means. A clamping means is positioned adjacent the opening in the sleeve means. The clamping means moves to a second position whereby the clamping means engages the stack of articles. The clamping means acts to hold the stack of articles in a substantially stationary position in the sleeve means. The clamping means does not hold the bottom article in the stack of articles.

A jaw means having support plates is positioned substantially beneath the clamping means. When the jaw means is in a first closed position, it supports the stack of articles. The jaw means is moved to a second open position, allowing the bottom article in the stack of articles to drop onto the receiving object. The jaw means is then moved to a third position adjacent the receiving object. The jaw means then is moved to a fourth position enclosing the bottom article. The jaw means acts to guide the article into alignment on the receiving article. An activating means moves the jaw means into an open position and simultaneously acts to position the clamping arms against the stack of articles. The activating means also acts to close the jaw means and to release the clamping means. A positioning means acts to move the sleeve means, the clamping means, the jaw means, and the activating means in a direction towards the receiving object.

It is the object of this invention to provide an improved apparatus for dispensing an article onto an object and positioning that article on the object.

It is a further object of this invention to provide an improved dispensing apparatus for positioning a generally rigid planar article onto a receiving object and positioning that article in a precise, predetermined location on that object.

Other objects and advantages of the invention will become apparent as the invention is described hereinafter in detail and with reference to the accompanying drawings.

DESCRIPTION OF THE PREFERRED EMBODIMENT

It is to be understood that the concepts embodied in the dispensing apparatus of the present invention may be applicable to various dispensing machines other than the mirror dispensing machine shown without departing from the scope of the invention. For example, the concepts of the present invention may be used with any dispensing machine wherein the article dispensed onto a receiving object is part of an assembled end product. Further, the article dispensed may be any generally rigid planar article.

Figure 1:
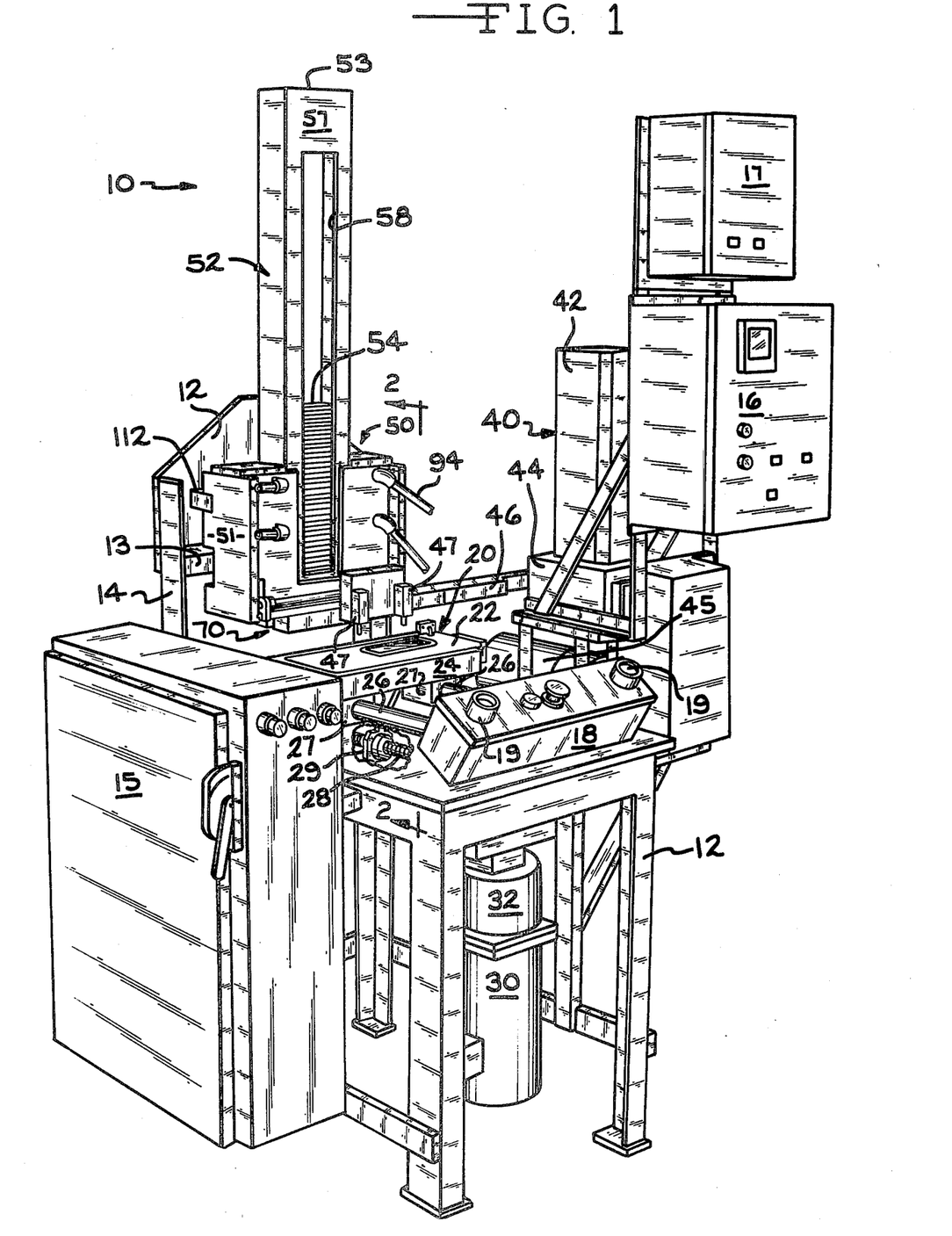
FIG. 1 is a perspective view of an assembly machine.

Referring now to the drawings, and to FIG. 1 in particular, an assembly machine 10 for attaching a mirror to a sun visor for use in automotive vehicles is shown. The assembly machine 10 generally includes a main frame 12, support frame member 13, angle support member 14, a main power supply control box 15, electronics control boxes 16 and 17, and a switch box 18. The switch box 18 includes palm buttons 19. The assembly machine 10 is activated by pressing palm buttons 19 simultaneously. Palm buttons 19 are well-known in the art and used to insure that the machine operator's hands are away from the various moving parts of a machine when the machine is activated.

Figure 2:
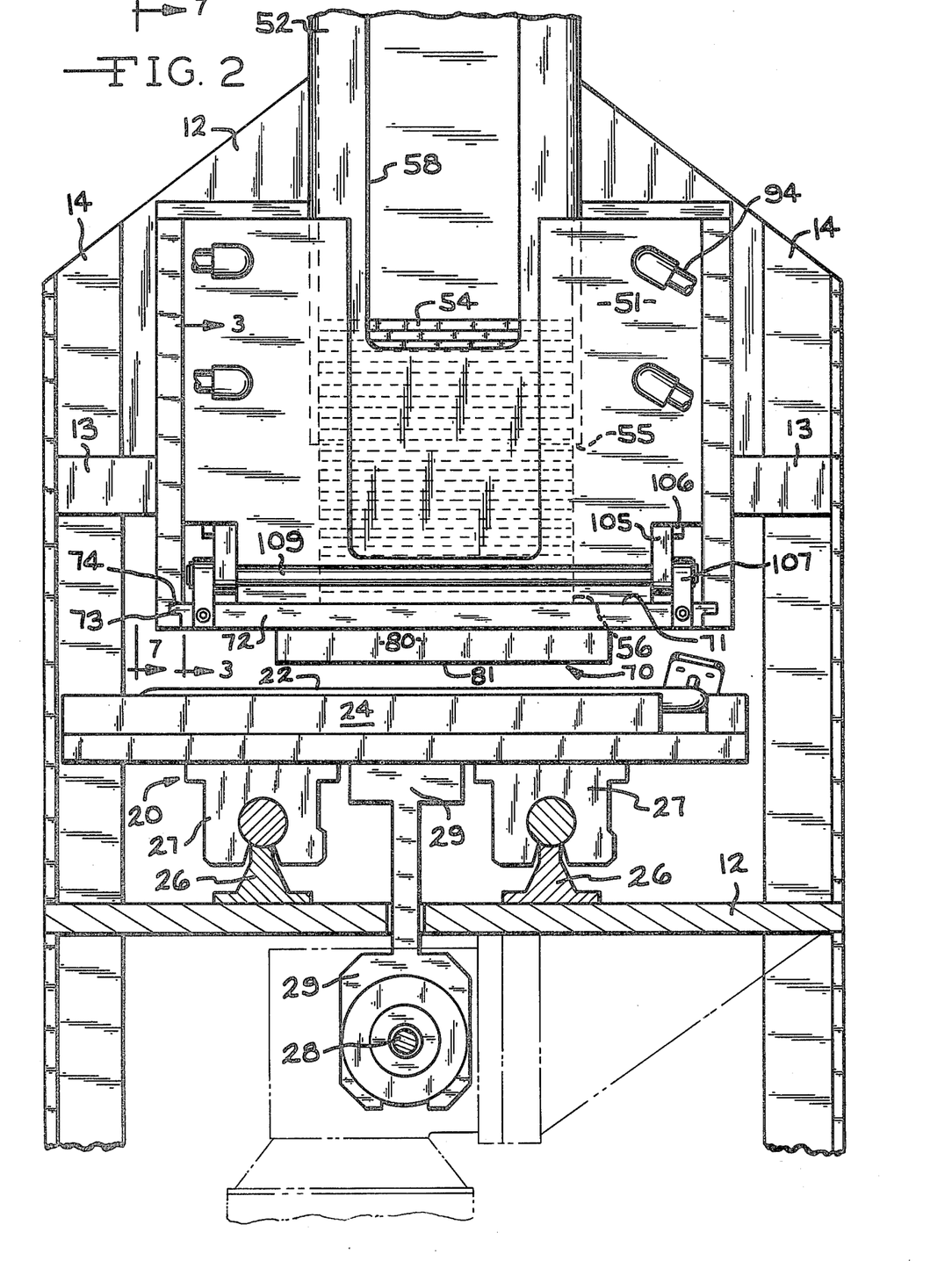
FIG. 2 is an elevational view taken along the line 2—2 in FIG. 1, showing the dispensing means.

The assembly machine 10 also generally includes a carrier means 20, a drive motor means 30, a glue dispensing means 40, an article dispensing means 50, and a positioning means 110. The carrier means 20, as shown in FIG. 2, includes a visor 22, or other receiving surface, placed on a visor carrier 24. The visor 22 is manually placed on the visor carrier 24 by a machine operator. The visor 22 can be placed on the visor carrier 24 such that the visor 22, when completely assembled, can be mounted in an automotive vehicle (not shown) on either the left or the right hand side. The visor carrier 24 is slideably mounted on rods 26 by slide blocks 27. The rods 26 extend longitudinally from adjacent the switch box 18 to the dispensing means 50.

The visor carrier 24 is mounted for movement on a worm 28 by an arm 29. The arm 29 extends downwardly from the visor carrier 24 and is axially positioned around the worm 28. When the worm 28 is rotated by a drive motor means 30, the arm 29 moves along the worm 28. As the arm 29 moves along the worm 28, the visor carrier 24 slideably moves along the rods 26. The drive motor means 30, as shown in FIG. 1, includes a gear reducer and brake means 32, which acts to stop the visor carrier 24 at various precise locations along the rods 26 and worm 28.

The glue dispensing means 40, which is known in the art, has a glue pot 42. Hot melt thermoplastic glue is placed in the glue pot 42. A heater 44 melts the glue. A drive motor means 45 moves the glue along a glue conduit 46 to glue heads 47. Glue is dispensed from each glue head 47 onto the visor 22.

Figure 5:
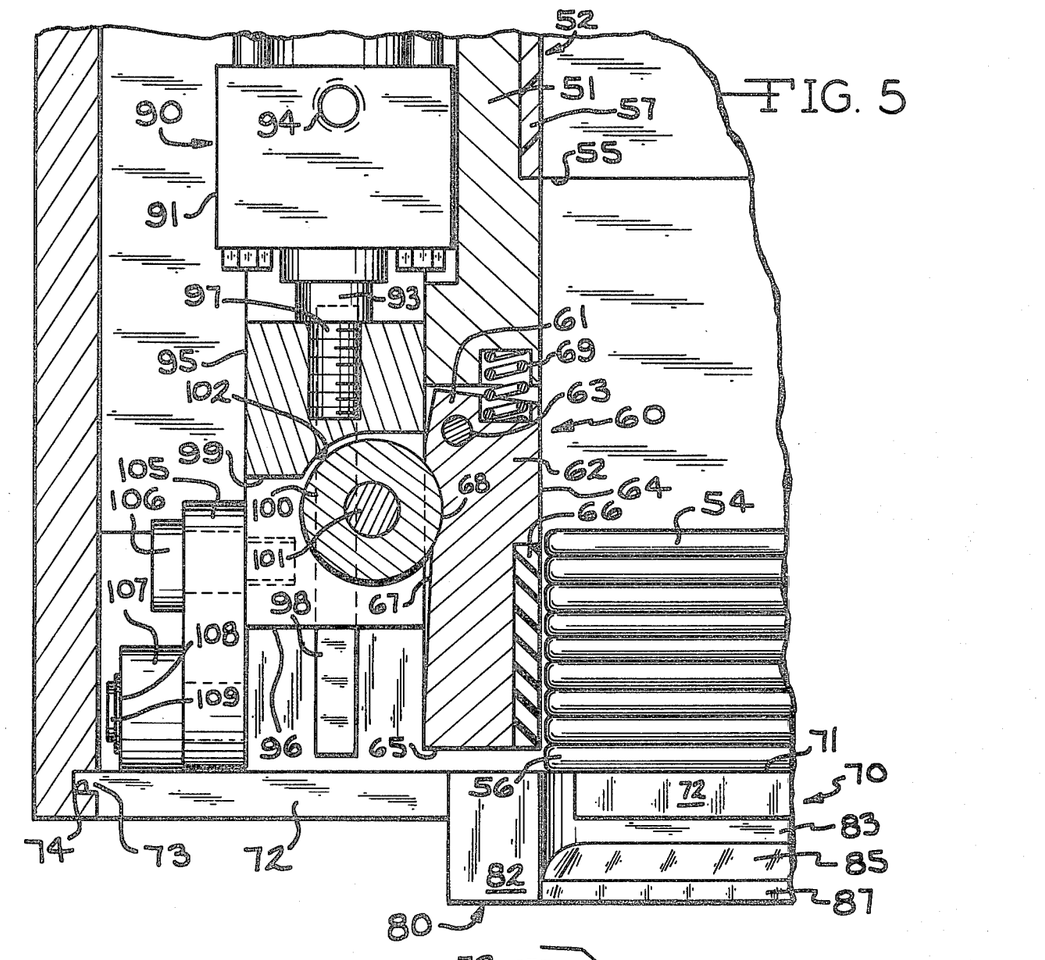
FIG. 5 is a fragmentary view, partially in cross section, taken along the line 5—5 in FIG. 3, showing one side of the dispensing means.

Mirrors, or other articles, are dispensed with accuracy and consistency by the use of a dispensing means 50, which includes a positioning means 110. The mirror dispensing means 50 is incorporated into the assembly machine 10 such that the assembly machine 10 will dispense and position the mirror in a precise location. The mirror dispensing means 50 generally includes a sleeve means 52, a clamping means 60 (FIG. 5), a jaw means 70, an activating means 90, and the positioning means 110.

The sleeve means 52 is mounted in a housing 51. The sleeve means 52 is tubular, having a shape corresponding to the articles dispensed. The sleeve means 52 has a top opening 53 and a bottom opening 55. The bottom opening 55 is adjacent the clamping means 60 and vertically spaced from the jaw means 70. A stack of mirrors 54 is placed in the sleeve means 52 through the top opening 53. The cross-sectional size of the sleeve means 52 is normally slightly larger than the cross-sectional size, or outer perimeter, of the stack of mirrors 54 such that the stack of mirrors 54 can easily move down the sleeve means 52. The stack of mirrors 54 is held in a substantially upright position between walls 57 of the sleeve means 52. The stack of mirrors 54 extends through the bottom opening 55 such that the bottom mirror 56 rests on the jaw means 70. The bottom mirror 56 supports the stack of mirrors 54.

The sleeve means 52 has a side opening 58 in one wall 57. The side opening 58 extends along the length of the sleeve means 52. The stack of mirrors 54 is visible through the side opening 58 which allows the machine operator to see the number of mirrors in the sleeve means 52 and thereby determine when the stack of mirrors 54 should be replenished. The sleeve means 52 can be detached from the mirror dispensing means 50 to facilitate the loading of a stack of mirrors 54 in the sleeve means 52. A variety of sleeve means, each with a different interior cross-sectional shape, can be used such that the interior cross-sectional shape of the sleeve means is similar to the cross-sectional shape of the article to be dispensed.

The clamping arms 62 have biasing means 69 which extend from the clamping arms 62 and are attached to the housing 51. The biasing means 69 prevent the clamping arms from freely pivoting about the axes of the pivot pins 63. The biasing means 69 return the clamping arms 62 to the parallel position adjacent the edge of the stack of mirrors 54 when the activating means 90 disengages the clamping arms 62.

The clamping means 60 is positioned beneath the sleeve means 52. One side of the clamping means 60 is shown in detail in FIG. 5. The side not shown is the same as the illustrated side. The clamping means 60 includes at least two clamping arms 62. The clamping arms 62 are in opposed relationship. The upper ends 61 of clamping arms 62 are attached to the housing 51 by means of pivot pins 63. The lower part of the stack of mirrors 54 is positioned between each clamping arm 62.

The clamping arms 62 are substantially parallel to the adjacent edge of the stack of mirrors 54. The clamping arms 62 are pivoted about the axes of pivot pins 63 in a direction towards the stack of mirrors 54. As clamping arms 62 pivot about pivot pins 63 the faces 64 engage the stack of mirrors 54. The faces 64 can include gripping surfaces 66. The gripping surfaces 66 are made of a elastomeric material, such as a Neoprene material. The gripping surfaces 66 generally are positioned in the lower part of the faces 64 but it should be understood that the gripping surfaces 66 can extend for any length along the surface of faces 64. The gripping surfaces 66 are in substantially the same plane as the faces 64 and the extended walls 57 when the faces 64 are in the retracted position shown in FIG. 5. The gripping surfaces 66 act to hold the stack of mirrors 54 stationary in the sleeve means 52 when clamping arms 62 engage the stack of mirrors 54.

The clamping arms 62 have bottom surfaces 65 which are spaced from the surface 71 of the jaw means 70. When the clamping arms 62 are positioned against the stack of mirrors 54, the portions of faces 64 which are adjacent the bottom surfaces 65 do not engage the bottom mirror 56 in the stack of mirrors 54. The bottom mirror 56 rests on the jaw means surface 71.

The clamping arms 62 are moved to a position against the stack of mirrors 54 by an activating means 90 and a cam roller means 100, which are described in detail below. The backs 67 of clamping arms 62 contain cam grooves 68. The outside diameters of the cam grooves 68 are complementary with the outside diameters of the cam roller means 100. The activating means 90 acts to pivot the clamping arms 62 about the axes of the pivot pins 63. Once the cam roller means 100 overcome inertia and are displaced from the cam grooves 68 there is an initial quick movement of the clamping arms 62 against the stack of mirrors 54. The back surfaces 67 are ramped such that after the initial quick movement of the clamping arms 62 towards the stack of mirrors 54, further movement of the roller means 100 causes only slight movement of the clamping arms 62 against the stack of mirrors 54. The stack of mirrors 54 is held firmly in place between the clamping arms 62 such that the stack of mirrors 54 does not move in the sleeve means 52, and yet, the force of the clamping arms 62 is not great enough to damage the mirrors.

The jaw means 70 is positioned beneath the clamping means 60. The jaw means 70 includes support plates 72 and alignment blocks 80. The support plates 72 are thick enough to support the weight of the stack of mirrors 54. The support plates 72 are parallel to and spaced apart from the bottom surfaces 65 of the clamping means 60. The support plates 72 are in a mating relationship when the jaw means 70 is in a closed position. The upper surfaces 71 of the support plates are in the same plane. The weight of the stack of mirrors 54 is distributed evenly upon each support plate 72.

The support plates 72 have longitudinally extending edges 75 that are parallel to each other. The edges 75 are perpendicular to the surfaces 71. Shoulders or keys 73 extend along end portions of the support plates 72. The keys 73 are positioned in grooves or keyways 74 defined in the housing 51 of the mirror dispensing means 50 (See FIG. 5). The cross-sectional shape of the keyways 74 is complementary with the cross-sectional shape of the keys 73 to effect a sliding relationship. The keys 73 hold the jaw means 70 in position in the mirror dispensing means 50. The keys 73 allow the support plates 72 to be opened and closed by the activating means 90. As the jaw means 70 is moved to the open position the bottom mirror 56 is no longer supported by the support plates 72. The bottom mirror 56 drops between the support plates 72 onto the visor 22 which is positioned below the jaw means 70.

Alignment blocks 80 are attached to the support plates 72. The alignment blocks 80 are positioned on the side opposite the upper surfaces 71. The alignment blocks 80 are in close adjacent relationship when the jaw means 80 is in the closed position. The alignment blocks 80 are shown as substantially identical rectangular blocks, but it should be understood that other shapes can be used. The alignment blocks 80 are made of an elastomeric material such as a Neoprene material.

Figure 6:
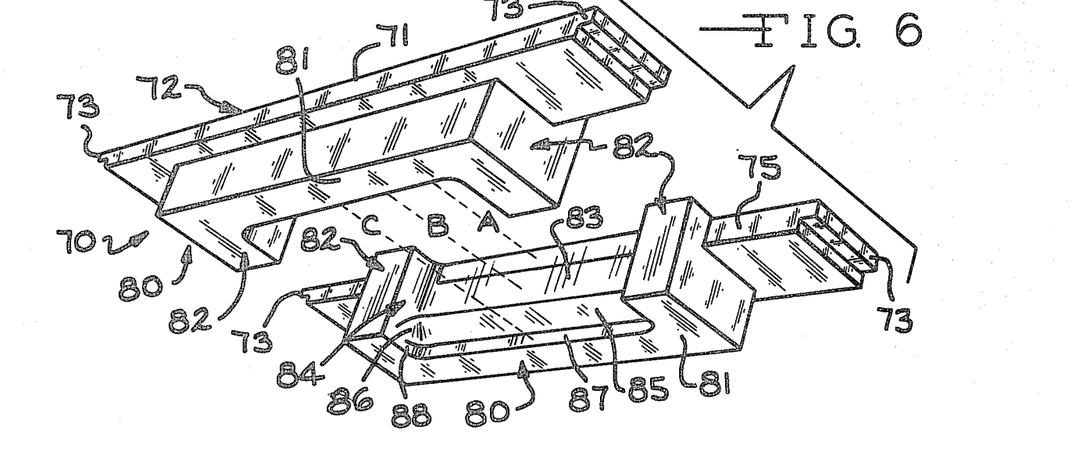
FIG. 6 is a perspective view of the jaw means, according to the present invention, showing the recessed surfaces.

The alignment blocks 80, as shown in FIG. 6., include bottom surfaces 81, ends 82, and recessed surfaces 83, 84, 85, 86, 87 and 88. When the jaw means 70 is closed, the recessed surfaces 85-88 define an opening which mates with and receives a mirror 54. The shapes of the recessed surfaces will be determined by the shape of the article to be dispensed.

Each alignment block 80 is attached to a support plate 72 such that ends 82 of one alignment block 80 are substantially parallel to the end portions 82 of the other block 80. The recessed surfaces 83 are substantially perpendicular to surfaces 71. The recessed surfaces 83 form a C-shape on the interior surface of the alignment blocks 80. The middle portions of the recessed surfaces 83 are adjacent the edges 75 and are in substantially the same plane as the edges 75. The end portions 84 of the recessed surfaces 83 extend into the ends 82 of the alignment blocks 80. The end portions 84 of the recessed surfaces 83 curve away from the edges 75 at a substantially right angle. The end portions 84 extend along the edges 75 such that the end portions 84 are in substantially perpendicular to the surfaces 71.

The recessed surfaces 83 terminate at recessed surfaces 85. The recessed surfaces 85 are sloped away from the recessed surfaces 83 at an acute angle. The middle portions of the recessed surfaces 85 can be disposed at approximately a 45° angle to the recessed surfaces 83. The end portions 86 of the recessed surfaces 85 extend from the end portions 84 at a lesser angle than the middle portions of the recessed surfaces 85. The angles of the end portions 85 gradually decrease such that the end portions 86 are in substantially the same plane as the end portions 84. The sloped recessed surfaces 85 act to position the bottom mirror 56 in a downward direction against the visor 22 as the jaw means 70 closes.

The recessed surfaces 85 terminate at recessed surfaces 87. The recessed surfaces 87 are substantially parallel to the plane formed by the edges 75 and the recessed surfaces 83. The recessed surfaces 87 are substantially perpendicular to the bottom surfaces 81. The end portions 88 of the recessed surfaces 87 also extend into the end portions 82 of the alignment blocks 80. When the alignment blocks 80 are moved to a close adjacent relationship the recessed surfaces 87-88 act to position the mirror 56 in a precise location on the visor 22. The recessed surfaces 87-88 define a perimeter, when the jaw means 70 is in the closed position, that is complementary with the perimeter of the mirror 56.

Figure 3:
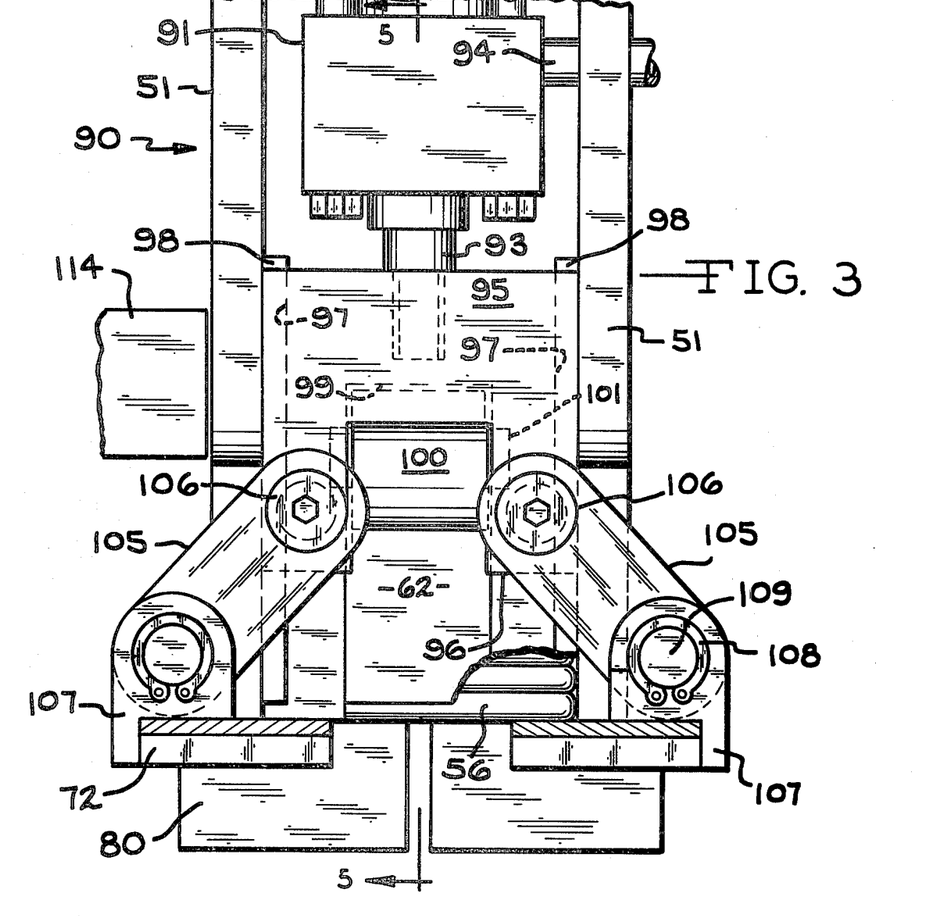
FIG. 3 is a fragmentary view partially in cross section taken along the line 3—3 in FIG. 2, showing the jaw means in the closed position.
Figure 4:
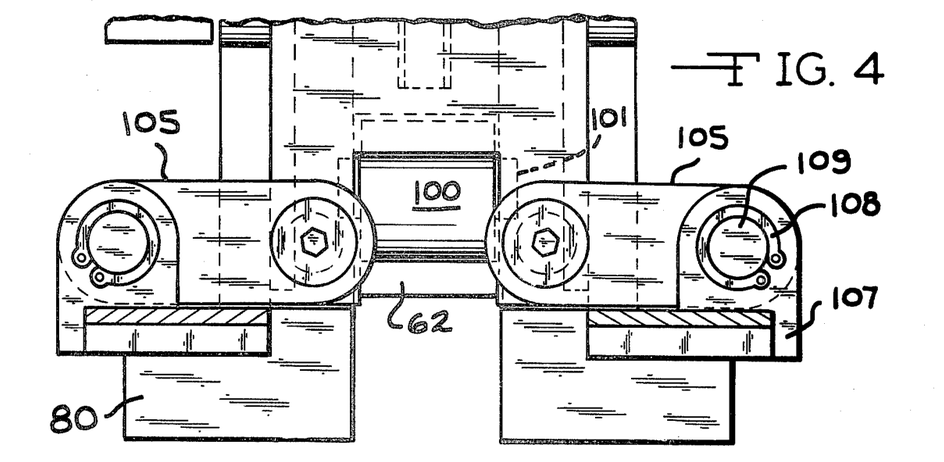
FIG. 4 is a view similar to FIG. 3 showing the jaw means in the open position.

The activating means 90 are positioned adjacent the lower part of the housing 51 of the mirror dispensing means 50. The activating means 90 act to position the clamping means 60 against the stack of mirrors 54 and to open the jaw means 70. For ease of illustration, only one side of the activating means 90 is shown in detail in FIGS. 3, 4 and 5. The side not shown is substantially the same as the illustrated side.

The activating means 90 generally includes cylinders 91, slide blocks 95, and link means 105. The cylinders 91, which in this embodiment are air cylinders, have rods 93. Conduits 94 supply compressed air to the air cylinders 91.

The cylinder rods 93 are attached to slide blocks 95. The slide blocks 95 are positioned adjacent the clamping means 60. The bottom surfaces 96 of the slide blocks 95 are spaced from and are substantially parallel to the plate means 72. Slide blocks 95 have key ways 97 which extend vertically along the side of the slide blocks 95. The key ways 97 matingly engage keys 98 on the housing 51 (See FIG. 3). The slide blocks 95 are guided by the keys 98 when the slide blocks 95 are displaced towards the jaw means 70.

Slide blocks 95 include recesses 99 which are in substantially the center of the slide blocks 95. The cam roller means 100, discussed previously, are journalled in recesses 99. Pins 101 extend coaxially through the cam roller means 100 and position the cam roller means 100 in the recesses 99 of the slide blocks 95. The roller means 100 are positioned against the backs 67 of the clamping arms 62 in grooves 68. The outside diameters of the roller means 100 are complementary with the outside diameters of the grooves 68 such that the grooves 68 matingly accept the roller means 100. The recesses 99 have curved surfaces 102 which extend along the length of the roller means 100. The arcs of the curved surfaces 102 are slightly larger than the outside diameters of the roller means 100 such that the roller means 100 can freely rotate about axes defined by the pins 101.

The slide blocks 95 are connected to the jaw means 70 by links 105 which are positioned at the ends of each support plate 72. The links 105 are positioned on the sides of the slide blocks 95 opposing the roller means 100 and the clamping arms 62. The links 105 are pivotally attached to the slide blocks 95 by shoulder bolts 106.

The links 105 are attached to the jaw means 70 by brackets 107. The brackets 107 extend vertically from each end of the support plates 72. The brackets 107 and the links 105 are pivotally connected by pins 109. The axes of pins 109 are parallel to surfaces 71 of the plate means 72. Snap rings 108 retain the pins 109 within the brackets 107.

During the operation of the activating means 90, the cylinders 91 move their rods 93 in a direction towards the plate means 72. The rods 93 act to move the slide blocks 95 along the keys 98 on the housing 51. As the slide blocks 95 move along the keys 98 the cam roller means 100 is dislodged from grooves 68 in the clamping arms 62. As the cam roller means 100 move over the corners of grooves 68 and the backs 67 there is an initial quick movement of the clamping arms 62 in a direction towards the stack of mirrors 54. As the slide blocks 95 continue to move along keys 98 the roller means 100 engage the backs 67. The backs 67 are sloped such that further clamping of the clamping arms 62 against the stack of mirrors 54 is gradual.

As the blocks 95 move along the keys 98 towards the plate means 72, the links 105 pivot about the shoulder bolts 106 and the pins 109. The ends of the links 105 that are attached to the slide blocks 95 by shoulder bolts 106 move in a direction parallel to the direction of the slide blocks 95. As the links 105 pivot about pins 109 the plate means 72 move in a direction perpendicular to the direction of the slide blocks 95 causing the jaw means 70 to open. The bottom mirror 56, which is not being held by the clamping arms 62, drops through the open jaw means 70 onto the visor 22. The dropped mirror 56 is aligned on the visor 22 by the jaw means 70 and a positioning means 110.

The positioning means 110 is adjacent the mirror dispensing means 50. The positioning means 110 is mounted on the main frame 12 by brackets 111 and support member 13.

Figure 7:
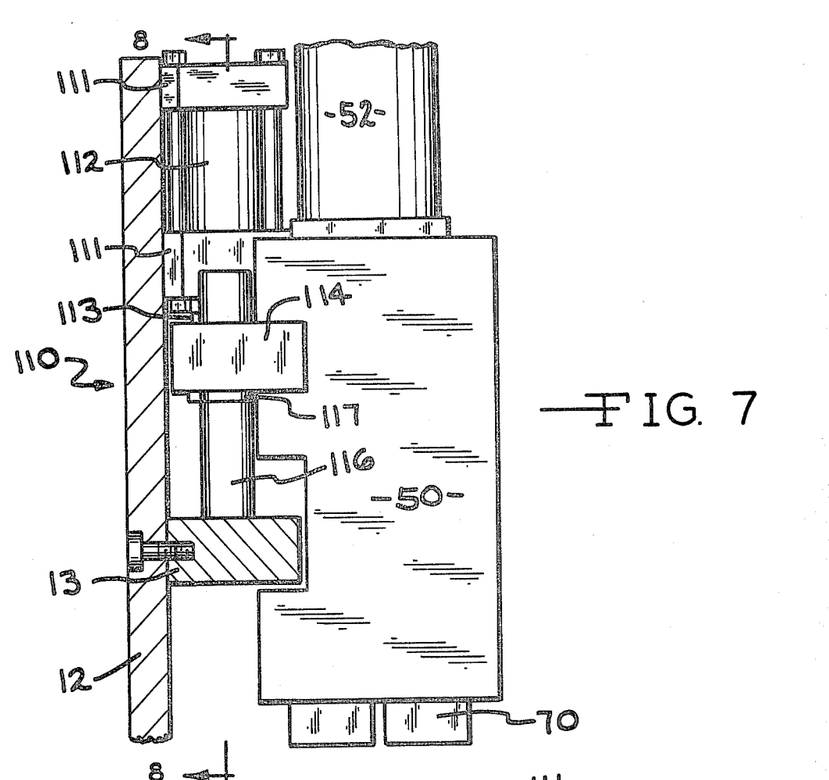
FIG. 7 is a view, partially in cross section, taken along the line 7—7 in FIG. 2, showing the dispensing means and the positioning means.
Figure 8:
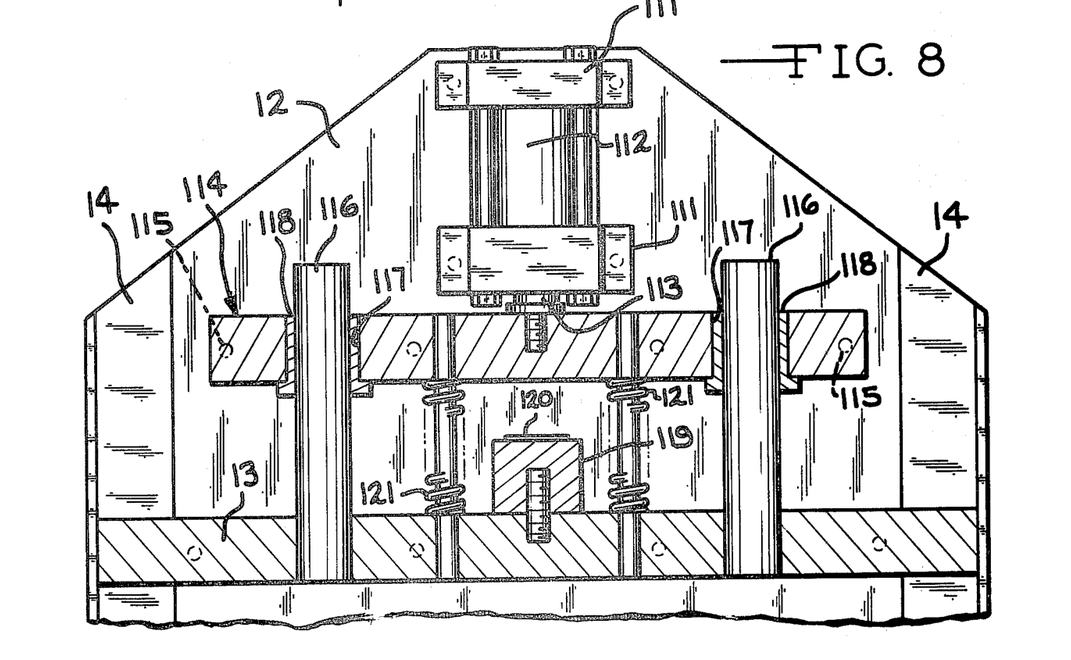
FIG. 8 is a view taken along the line 8—8 in FIG. 7, showing the positioning means.
Figure 9:
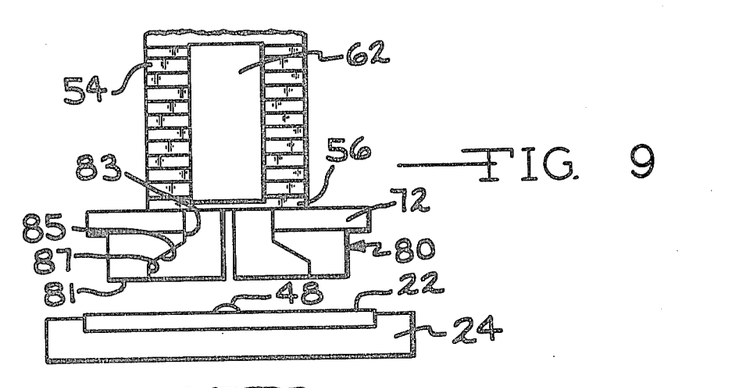
FIG. 9 is a schematic view, according to the present invention, showing a first position of the dispensing means.
Figure 10:
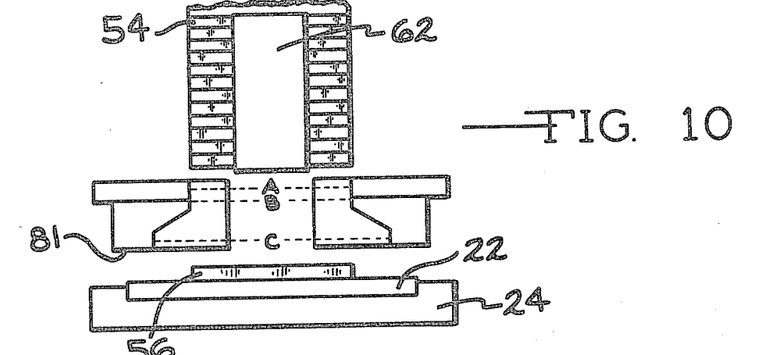
FIG. 10 is a schematic view, according to the present invention, showing a second position of the dispensing means.
Figure 11:
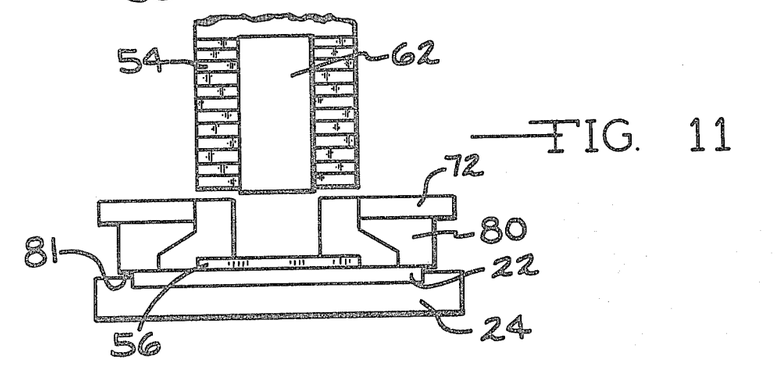
FIG. 11 is a schematic view, according to the present invention, showing a third position of the dispensing means.
Figure 12:
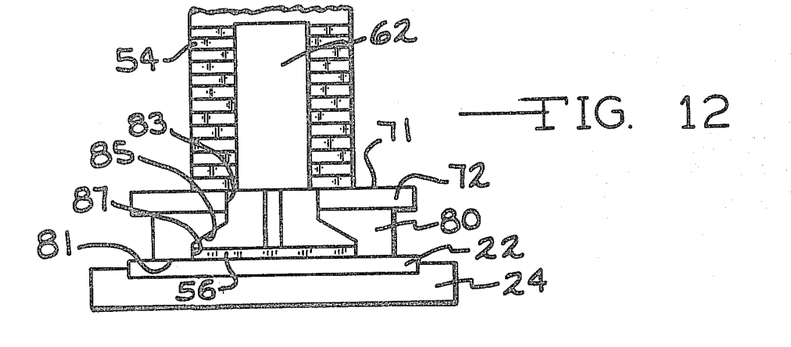
FIG. 12 is a schematic view, according to the present invention, showing a fourth position of the dispensing means.

The positioning means 110, as shown in FIGS. 7 and 8, generally includes a main cylinder 112, a carrier arm 114, guide rods 116, stop blocks 119 and spring return means 121. The main cylinder 112, or other means for providing a downward force, is attached to the main frame 12 by brackets 111. A cylinder rod 113 extends from the main cylinder 112 and is attached to the carrier arm 114. The carrier arm 114 is positioned adjacent the mirror dispensing means 50 and is attached to the mirror dispensing means 50 by a number of bolts 115. The carrier arm 114 is substantially parallel to the support frame member 13 and is spaced apart from the support frame member 13. The carrier arm 114 is attached to the support frame member 13 by guide rods 116. The guide rods 116 extend from the support frame member 13 in a direction towards the carrier arm 114. The guide rods 116 extend through openings 117 in the carrier arm 114. Bushings 118 are coaxially placed in the openings 117 such that the guide rods 116 extend through the bushings 118. The bushings 118 act to guide the movement of the carrier arm 114. The carrier arm 114 is slideably moved along the guide rods 116 by the main cylinder 112 in a direction towards the support frame member 13. The main cylinder 112 acts to position the carrier arm 114 and the mirror dispensing means 50 at a point on the guide rods 116 such that the jaw means 70 is positioned adjacent the visor 22. A stop block 119 is positioned beneath the carrier arm 114 on the support frame member 13. The stop block 119 acts to limit the downward travel of the carrier arm 114. A cushioning means 120 is placed on the stop block 119 to prevent jarring of the carrier arm 114 as the main cylinder 112 moves the carrier arm 114 along the guide rods 116. The cushioning means 120 is, for example, a thin piece of an elastomeric material such as a Neoprene material. Spring return means 121 extend from the support frame member 13 to the carrier arm 114. Spring return means 121 act to assist in returning the carrier arm 114 to its start position when the positioning means 110 moves in a direction away from the visor carrier 24. The spring return means 121 are compressed on the downstroke of the cylinder rod 113 and supply a compensating force on the upstroke of the cylinder rod 113.

During the operation of the assembly machine 10, a machine operator manually places a visor 22 on the visor carrier 24. After pushing palm buttons 19 the visor carrier 24 is then moved along rods 26 by rotation of the worm 28. The visor carrier 24 stops at a predetermined point along the rods 26 directly beneath the glue dispensing means 40. Hot melt glue 48 is dropped from glue heads 47 onto the visor 22. The visor carrier 24 is then moved further along the rods 26 to a point directly beneath the mirror dispensing means 50.

Referring now to FIGS. 6-12, and in particular to FIGS. 9-12, the jaw means 70 is in a closed position as the visor 22 is positioned beneath the mirror dispensing means 50. Distance A, as shown in FIG. 6, is the distance between the edges 75 of the support plates 72. Distance B is the distance between the recessed surfaces 83 of the alignment blocks 80. The edges 75 and recessed surfaces 83 of each jaw means 70 are in substantially the same plane; therefore, the distances A and B are substantially equal. When the jaw means 70 is in the closed position the support plates 72 are in close adjacent relationship. The distances A and B are less than the width of the bottom mirror 56. Thus, the bottom mirror 56 and the remaining stack of mirrors 54 rest on the upper surfaces 71 of the support plates 72.

As the activating means 90 acts to move the jaw means 70 to the open position, the support plates 72 are slideably moved along the keyways 74 by the links 105 in a direction away from each other. Simultaneously, the activating means 90 acts to move the clamping arms 62 in a direction towards the stack of mirrors 54. The clamping arms 62 engage the stack of mirrors 54. The clamping arms 62 do not engage the bottom mirror 56. The bottom mirror 56 rests on the surfaces 71 of the support plates 72.

As the support plates 72 continue to move in a direction away from each other the distances A and B are increased. When the jaw means 70 is in the open position the distances A and B are greater than the width of the bottom mirror 56. Thus, the bottom mirror 56 no longer rests on the support plates 72. The bottom mirror 56 drops between the edges 75 of the support plates 72 to the position on the visor 22 where the glue 48 has previously been dropped.

The positioning means 110 acts to move the carrier arm 114 and the mirror dispensing means 50 in a direction towards the visor 22. The positioning means 110 stops when the jaw means 70 is positioned adjacent the visor 22. The bottom surfaces 81 of the alignment blocks 80 abut the surface of the visor 22. The bottom mirror 56 is positioned on the visor 22 between the alignment blocks 80. The activating means 90 acts to move the jaw means 70 to the closed position. As the support plates 72 move along keyways 74 in a direction towards each other the distances A, B and C decrease. As the distance C decreases the recessed surfaces 87 of the alignment blocks 80 engage the edges of the bottom mirror 56. The recessed surfaces 87 act to align the bottom mirror 56 at a precise location on the visor 22. The distance C is complementary with the width of the bottom mirror 56 when the jaw means 70 is in the closed position. Thus, the bottom mirror 56 is aligned within the alignment blocks 80 on the visor 22 in a predetermined location.

As the activating means 90 moves the jaw means 70 to the closed position and the support plates 72 move in a direction towards each other, the activating means 90 simultaneously acts to disengage the clamping arms 62 from the stack of mirrors 54. The stack of mirrors 54 slideably moves in the sleeve means 52 in a direction towards the support plates 72. When the jaw means 70 is in the closed position the support plates 72 are in closed adjacent relationship and the stack of mirrors 54 agains rests on the support plates 72.

The jaw means 70 remains in position against the surface of the visor 22 for a brief period of time. This period of time in the disclosed operations is approximately 4 seconds, but it is understood that the elasped time will be determined by various factors, including the type of glue dispensed. This elapse of time allows the drop of hot melt thermoplastic glue 48 to set. The positioning means 110 acts to move the carrier arm 114 and the mirror dispensing means 50 in a direction away from the visor 22. The bottom mirror 56 remains positioned on the visor 22.

The above-detailed description of the invention is given only for the sake of explanation. Various modifications and substitutions other than those cited, can be made without departing from the scope of the invention as defined in the following claims.

What I claim is:

1. A dispensing apparatus for placing a generally rigid planar article onto a receiving surface in a predetermined position comprising: sleeve means for containing a stack of such articles, said sleeve means having an opening at its lower end, clamping means for engaging a portion of such stack of articles when in an engaged position, said clamping means acting to hold said stack in a stationary position in said sleeve means, said clamping means not acting to hold the lowermost article in such stack of articles, said clamping means being movable between the engaged position and a disengaged position, said clamping means including a clamping arm, said clamping arm being pivotally mounted and positioned adjacent such stack of articles, and camming means for pivoting said clamping arm into the engaged position relative to such stack of articles, said camming means including a cam surface on said clamping arm, jaw means for supporting such stack of articles, said jaw means being movable between open and closed positions, said jaw means when in the open position acting to allow the lowermost article in such stack to drop onto the receiving surface, and activating means for moving said clamping means between the engaged position and the disengaged position and for moving said jaw means between the open position and the closed position; said activating means including a slide member operatively connected to a cam roller engagable with such cam surface on said clamping arm, said slide member being operatively connected to said jaw means, whereby vertical movement of said slide member moves said jaw means between said open position and said closed position and moves said clamping arm between the engaged and disengaged positions.

2. A dispensing apparatus according to claim 1, wherein said sleeve means can be detached from said dispensing apparatus.

3. A dispensing apparatus according to claim 1, wherein said sleeve means has an opening in one wall, said opening extending substantially along the length of said sleeve means, whereby such stack of articles in said sleeve means is easily viewed.

4. A dispensing apparatus according to claim 1, wherein said sleeve means has a top opening whereby such stack of articles can be placed into said sleeve means.

5. A dispensing apparatus according to claim 1, wherein said clamping arm includes a gripping surface, said gripping surface being positioned adjacent such stack of articles.

6. A dispensing apparatus according to claim 5, wherein said gripping surface comprises an elastomeric material.

7. A dispensing apparatus according to claim 1, wherein said jaw means includes support plates, said support plates being positioned in close adjacent relationship when said jaw means is in the closed position, said support plates being moved in a direction away from each other when said jaw means is being moved to the open position, whereby said support plates act to support such lowermost article in such stack of articles when said jaw means are in the closed position and whereby such lowermost article drops downward when said jaw means is in the open position.

8. A dispensing apparatus according to claim 7, wherein said jaw means includes alignment blocks, said alignment blocks having a plurality of recessed surfaces complementary with the periphery of such lowermost article, said recessed surfaces being in close adjacent relationship with such lowermost article when said jaw means is in the closed position, whereby such article is positioned in said predetermined position.

9. A dispensing apparatus for placing a generally rigid planar article onto a receiving surface in a predetermined position comprising:
sleeve means for containing a stack of such articles, said sleeve means having an opening at its lower end,
clamping means for engaging a portion of such stack of articles when in an engaged position whereby said clamping means acts to hold said stack in a stationary position in said sleeve means, said clamping means not acting to hold the lowermost article in such stack of articles, said clamping means being movable between the engaged position and a disengaged position, said clamping means including a clamping arm, said clamping arm being pivotally mounted and positioned adjacent such stack of articles, and camming means for pivoting said clamping arm into the engaged position relative to such stack of articles, jaw means for supporting such stack of articles, said jaw means being movable between open and closed positions, said jaw means when in the open position acting to allow the lowermost article in such stack to drop onto the receiving surface, said jaw means upon moving to the closed position engaging and positioning the lowermost article;

activating means for moving said clamping means between the engaged position and the disengaged position and for moving said jaw means between the open position and the closed position; said activating means including a slide block, said slide block having a key way, said key way engaging a key means on said dispensing apparatus housing, said camming means including a cam roller and a cam surface on said clamping arm, said slide block being operatively connected to said cam roller, link means pivotally connected between said slide block and said jaw means, whereby vertical movement of said slide block moves said jaw means between said open position and said closed position; and means for positioning an article, which has been dropped upon such receiving surface in a predetermined position on such receiving surface.

10. A dispensing apparatus according to claim 9, wherein said clamping arm defines a cam groove, said cam groove complementary with said cam roller, said cam roller being positioned in said cam groove, said cam roller being displaced from said cam groove when said slide block is vertically moved in a direction towards said jaw means, said clamping arm being moved in a direction towards said jaw means, said clamping arm being moved in a direction towards said stack of articles, whereby said clamping arm engages said stack of articles.

11. A dispensing apparatus according to claim 9, wherein said activating means further includes cylinder means operatively connected to said slide block, whereby said cylinder means acts to move said slide block along said key means on said housing.

12. A dispensing apparatus for placing a generally rigid planar article onto a receiving surface in a predetermined position comprising:

sleeve means for containing a stack of such articles, said sleeve means having an opening at its lower end, clamping means for engaging a portion of such stack of articles when in an engaged position whereby said clamping means acts to hold said stack in a stationary position in said sleeve means, said clamping means not acting to hold the lowermost article in such stack of articles, said clamping means being movable between the engaged position and a disengaged position, jaw means for supporting such stack of articles, said jaw means being movable between open and closed positions, said jaw means when in the open position acting to allow the lowermost article in such stack to drop onto the receiving surface, said jaw means upon moving to the closed position engaging and positioning the lowermost article;

positioning means including a carrier arm, said carrier arm being operatively connected to said jaw means, vertical guide rods for guiding the vertical travel of said carrier arm, a stop means positioned below said carrier arm, said stop means acting to limit the travel of said carrier arm, and spring return means for assisting upward travel of said carrier arm;

activating means for moving said clamping means between the engaged position and the disengaged position and for moving said jaw means between the open position and the closed position; and means for positioning an article, which has been dropped upon such receiving surface, in such predetermined position on such receiving surface.

13. A dispensing apparatus according to claim 12, wherein said positioning means includes a positioning cylinder attached to said carrier arm whereby said positioning cylinder acts to move said carrier arm along said vertical guide rods.

* * * * *